United States Patent
Albrecht, Jr. et al.

(10) Patent No.: US 7,458,774 B2
(45) Date of Patent: Dec. 2, 2008

(54) HIGH PRESSURE TURBINE DISK HUB WITH CURVED HUB SURFACE AND METHOD

(75) Inventors: Richard William Albrecht, Jr., Fairfield, OH (US); Craig William Higgins, Liberty Township, OH (US)

(73) Assignee: General Electric Company, Schenectady, NY (US)

( * ) Notice: Subject to any disclaimer, the term of this patent is extended or adjusted under 35 U.S.C. 154(b) by 252 days.

(21) Appl. No.: 11/306,227

(22) Filed: Dec. 20, 2005

(65) Prior Publication Data

US 2007/0140856 A1     Jun. 21, 2007

(51) Int. Cl.
*F01D 5/02* (2006.01)
(52) U.S. Cl. .................. 416/1; 416/248; 416/198 A
(58) Field of Classification Search .............. 415/115, 415/199.5; 416/198 A, 248, 1
See application file for complete search history.

(56) References Cited

U.S. PATENT DOCUMENTS

| 5,275,534 A | 1/1994 | Cameron et al. |
| 5,630,703 A | 5/1997 | Hendley et al. |
| 5,961,287 A * | 10/1999 | Cairo ................. 416/97 R |
| 6,375,421 B1 * | 4/2002 | Lammas et al. ......... 415/199.5 |

FOREIGN PATENT DOCUMENTS

GB     2112461 A  *  7/1983

* cited by examiner

*Primary Examiner*—Ninh H Nguyen
(74) *Attorney, Agent, or Firm*—Adams Intellectual Property Law, P.A.; William Scott Andes, Esq.

(57) ABSTRACT

A first stage turbine disk section for a gas turbine engine, including a centrally disposed disk hub having an integrally-formed, radially outwardly extending web terminating at an outer end. The disk hub has a convex, curved hub surface exposed to high pressure, high temperature compressor bleed and discharge gases during engine operation, and the convex, curved hub surface acts to reduce the axial constraint at the location of peak axial stress, thereby mitigating the formation of undesirable axial stress in the disk hub and allows separation of the peak axial and hoop stresses, thereby reducing the magnitude of the peak hub surface effective stress.

4 Claims, 1 Drawing Sheet

HIGH PRESSURE TURBINE DISK HUB WITH CURVED HUB SURFACE AND METHOD

TECHNICAL FIELD AND BACKGROUND OF THE INVENTION

This invention relates to gas turbine engines, and more specifically to the reduction of axial stress in disk hubs of gas turbine aircraft engines. The invention is disclosed and explained in this application with specific reference to high pressure turbine ("HPT") disk hubs of gas turbine aircraft engines that are exposed to high temperature compressor bleed and discharge gases. Severe thermal gradients at the hub of HPT disks during takeoff can lead to high compressive axial stresses at the center of the hub surface. This high axial stress can lead to calculated life values well below engine program requirements. Prior art solutions have included large reductions in thermal gradients and/or the disk rim loading, or a large increase in hub size. These solutions negatively impact engine performance.

More particularly, current practices to reduce axial stress include adjusting the disk rim load, hub size, or idle hub flow to get adequate life from the disk hub. The approach of adjusting the disk rim load is indirect. The weight of the blades is reduced in order to reduce the hoop stress in the disk to the point that it meets life requirements even with the high axial hub stress. This approach has negative life and performance implications for the blade. Adjusting the hub size is indirect as well. This practice also reduces the hoop stress so that the disk will accommodate the large axial stress with acceptable life. This approach has negative weight and thermal performance impacts for the disk. Increasing the engine idle hub flow directly reduces the axial stress on the hub hub by warming the disk prior to takeoff. This, in turn, reduces the thermal gradient that causes the high axial stress. However, the high hub flow has negative system performance implications.

The invention disclosed and claimed in this application addresses this problem in a novel manner and thereby reduces axial stress on the HPT disk hub without disadvantageous tradeoffs incurred with prior art solutions.

SUMMARY OF THE INVENTION

According to one aspect of the invention, convex, curved, geometric features are introduced into the disk hub to mitigate high axial stress in HPT disk hubs.

According to another aspect of the invention, a convex, curved hub surface is formed on the disk hub.

DETAILED DESCRIPTION

Figure 1:
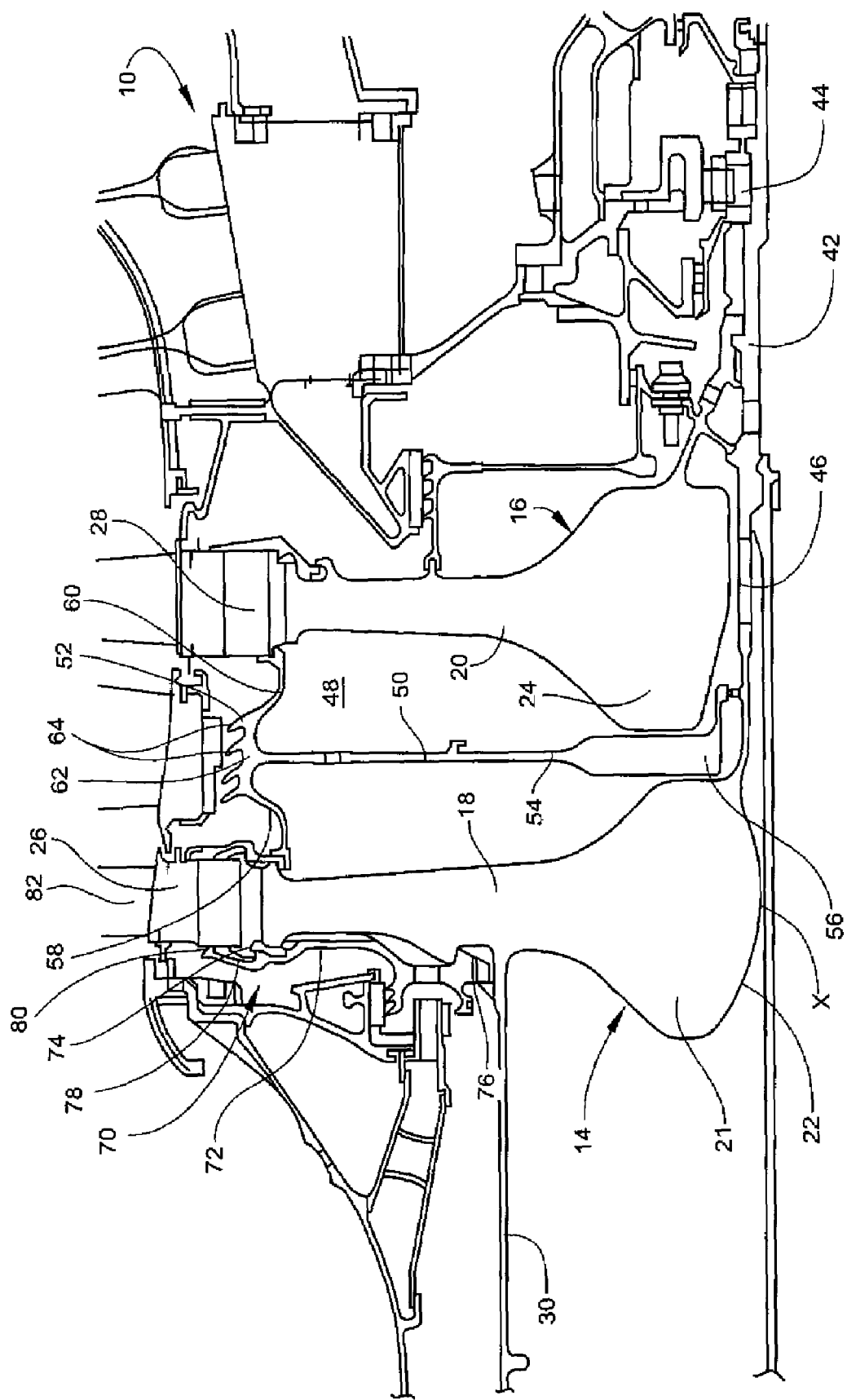
FIG. 1 is a fragmentary cross-section, taken along a longitudinal axis, of a HPT section of a gas turbine engine in accordance with one aspect of the invention.

Referring now to the drawing, FIG. 1 illustrates a portion of a HPT section 10 of an aircraft high bypass ratio gas turbine engine according to an aspect of the invention. The HPT section 10 includes first and second stage disks 14, 16, having respective webs 18, 20 extending outwardly from respective hubs 21, 24. The first stage disk hub 21 includes a convex, annular hub surface 22, described in further detail below. Dovetail slots 26, 28 are formed on the outer ends of the webs 18, 20, respectively.

The first stage disk 14 includes a forward shaft 30 that is integral with the web 18. The walls of the forward shaft 30 are essentially parallel with the axis of rotation of the engine. Hub 21 of the first stage disk 14 includes a rearwardly-extending aft shaft 42 that is threaded into engagement with a bearing 44. The shaft 42 includes a plurality of openings 46 that allow cooling air to enter the interstage volume 48. An interstage seal 50 is positioned between the first stage disk 14 and the second stage disk 16, and includes an outer shell 52 and a central disk 54 having a hub 56. Shell 52 is generally cylindrical with forward and aft-extending curved arms 58 and 60 that extend from a mid-portion 62 that supports seal teeth 64 and attach to the respective disks 14, 16.

Turbine section 10 also includes a forward outer seal assembly 70, that includes a faceplate 72 mounted on the first stage disk 14 by a bayonet connection 74 at a radial outer periphery and a bayonet connection 76 at a radial inner periphery. Faceplate 72 includes a blade retaining outer rim 78 that terminates at an axial flange 80 contacting the first stage blade 82.

The curved surface 22 of the first stage disk hub 21 significantly reduces the peak bore surface effective stress. This reduction is realized in two ways. First, the continuously curved hub surface forces the peak axial stress to the apex, located at "X" in FIG. 1. At this location, the peak axial compressive stress is reduced because the curvature of the free surface is forcing the principal stress field to transition from being primarily axially oriented to primarily radially oriented. In effect, the curved surface reduces the axial constraint of the surface at location "X". Second, the surface curvature separates the peak axial and hoop stresses, thereby allowing the surface effective stress to be optimized to its minimum value.

Optimum shape, angle, size and dimensions of the curved surface 22 are determined empirically by implementing a design change and then reviewing the effect of the change through computer analysis to observe the resulting stresses, rather than by a purely analytical method. The design process is adapted to balance the decrease in axial stress with an accompanying increase in hoop stress caused by lowering the cross-sectional area of the disk hub 21.

A gas turbine engine with reduced peak axial and effective stress in the disk bore surface is disclosed above. Various details of the invention may be changed without departing from its scope. Furthermore, the foregoing description of the preferred embodiment of the invention and the best mode for practicing the invention are provided for the purpose of illustration only and not for the purpose of limitation—the invention being defined by the claims.

What is claimed is:

1. A first stage turbine disk section for a gas turbine engine, comprising:
   (a) a centrally disposed disk hub having a radially outwardly extending web terminating at an outer end; and
   (b) the disk hub having a convex, continuously curved hub surface defining an apex positioned at a medial location on the hub surface opposite the outer end, the location of the apex selected so as to reduce the peak axial compressive stress by forcing the principal stress field to transition from being primarily axially oriented to primarily radially oriented, the continuously curved hub surface acting to reduce the effective axial constraint at the apex and to separate the peak axial and hoop stresses such that the surface effective stress is optimized to its minimum value, thereby mitigating the formation of undesirable axial stress in the disk hub.

2. A gas turbine section according to claim 1, wherein the disk hub includes only a convex, continuously curved hub surface and no cylindrical or frusto-conical hub surface areas thereon.

3. A gas turbine section according to claim 1, wherein the convex, continuously curved hub surface is positioned to shift maximum axial stress and hoop stress on the disk hub out of mutual alignment, thereby reducing the magnitude of the effective stress on the hub surface.

4. A method of reducing axial stress in a disk hub of a gas turbine disk, comprising the steps of:

(a) determining the location of stress gradients in a gas turbine disk hub;

(b) forming a convex, curved surface section in a disk hub surface of the disk hub that axially displaces peak axial stress relative to peak hoop stress and reduces the peak axial stress, thereby reducing the magnitude of the effective stress on the disk bore surface.

* * * * *